July 22, 1924.

W. R. MUDD 1,502,113

VEHICLE SIGNAL

Filed June 20, 1921

William R. Mudd
INVENTOR

BY J. M. Thomas
ATTORNEY

Patented July 22, 1924.

1,502,113

UNITED STATES PATENT OFFICE.

WILLIAM R. MUDD, OF EVANSTON, WYOMING.

VEHICLE SIGNAL.

Application filed June 20, 1921. Serial No. 478,974.

*To all whom it may concern:*

Be it known that I, WILLIAM R. MUDD, a citizen of the United States, residing at Evanston, in the county of Uinta and State of Wyoming, have invented certain new and useful Improvements in Vehicle Signals, of which the following is a specification.

My invention relates to signals, and has for its object to provide an economical signal for road vehicles, such as automobiles and trucks by which the operator may indicate the direction he will drive the vehicle without putting his hand out of the vehicle.

A further object is to provide certain parts of his signal with a lock whereby he may display a sign which will indicate that the vehicle has been stolen or is being operated without his consent.

These objects I accomplish with the apparatus illustrated in the accompanying drawings in which similar letters and numerals of reference indicate like parts throughout the several views, and as described in the specification forming a part of this application and pointed out in the appended claims.

Figure 1:
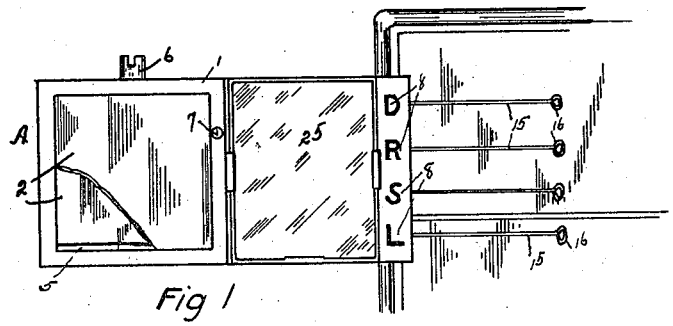
Figure 2:
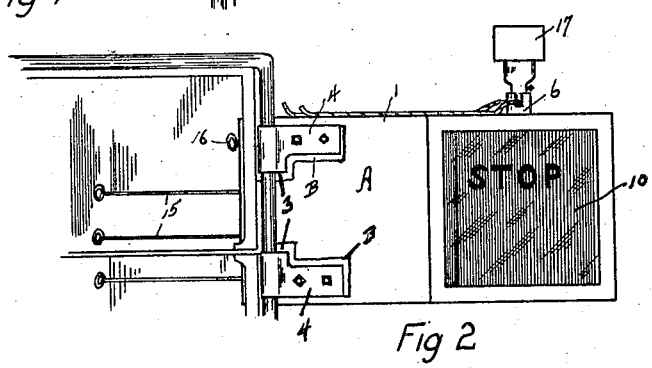
Figure 3:
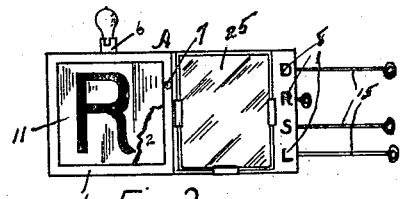
Figure 4:
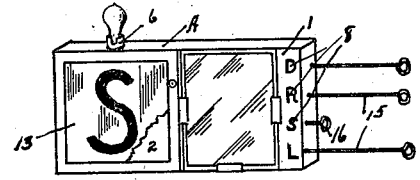
Figure 5:
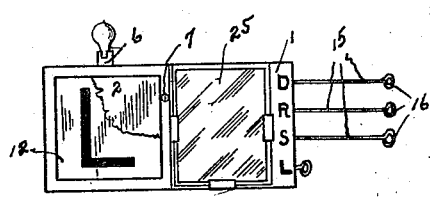

In the drawings in which I have shown a substantial embodiment of my invention, Figure 1 is a view of an automobile from the rear with my apparatus in place thereon and showing the sign case without any of the sign plates in sight. Figure 2 is a view from the front of an automobile with my apparatus in place thereon and with the danger sign displayed. Figure 3 is a side elevation of the apparatus with one of the direction signs displayed. Figure 4 is a view in perspective with one of the sign plates displayed on which is the sign to indicate the vehicle will be driven straight ahead. Figure 5 is a side elevation showing the sign for turning to the left.

I am aware that many direction signs have been patented and some have been used whereby arms, hands, semaphores of various shapes, and other signs may be displayed to indicate what the driver of the automobile intends to do as to turning, reducing his speed or stopping his machine, but so far as known to me none have been constructed as simple, with so few parts, and which are so easily operated and by which so many distinct signs may be quickly displayed.

The present invention consists of a rectangularly shaped case A, having a portion of each side wall 1 made of transparent material, such as glass or celluloid, as at 2. On the closed portion of one of said side walls 1 are attached two fastening brackets B, each having portions bent into curved form, as at 3, to fit the wind shield frame of an automobile, and on each of said brackets B is detachably secured a clamp 4 to coact with the portion 3 of the bracket, by which the case A is fastened on the vehicle, and in convenient position for the driver to operate. The said case A is made of thin material, preferably metal, and is given a box form having water-tight joints to protect the inner mechanism. The vertical sides, front and back, have portions cut out and replaced by transparent plates, such a glass or celluloid to form what I herein call the sight or transparent case, and on the rear is detachably secured a mirror 25. On the inner face of two opposed side edges of said frame A are provided slide races 5 within which the sign plates are operated. On the upper edge of said case A is provided a light socket 6 within which an electric light may be placed, and between the side walls 1 and preferably at the longitudinal center is fastened a lock with a keyhole 7 in one side wall through which the lock may be operated. Abbreviated signs or individual letters are printed or stenciled on one of said side walls of said case, as at 8, to aid the driver in operating the sign plates. One of the sign plates 10 is painted or colored red and has painted and stenciled thereon the word "Stop" to indicate that the car will be stopped in a short time. Another of said plates 11 has the letter R thereon, to indicate that the vehicle will turn to the right, and on another of said plates 12 is similarly marked L to indicate that the vehicle will turn to the left. If desired, other sign plates may be provided as shown on the plate 13 with letters or signs of direction, as "S" for straight ahead, or the word "Slow" to indicate that the vehicle will be slowed down or its speed will be reduced. An individuial slide rod 15 is fastened on one edge of each sign plate, which rods protrude through opening in the end of said case A and have finger pieces 16 by which each rod and plate may be independently moved. For use at night I provide an electric light with a shade 17 which extends beyond the side walls 1 to direct the light on the sign plates when they are exposed within the transparent portion 2 of the case.

The operation of my signal is as follows:

With bolts passed through the clamps 4 and brackets 3 the apparatus is secured on the frame of the wind shield. The driver may indicate the direction in which he will drive the vehicle by moving the desired plate to the transparent portion of said case A by moving the connecting rod 15 of that particular plate toward the left. If the rod and plate of the danger signal 10 is moved to the sight position or behind the transparent plates, and the lock is operated through the keyhole 7 all of the sign plates will be locked against movement, and the danger signal will be displayed until the lock is operated; this use is to prevent theft of the vehicle. When the driver is going to turn a corner toward the right, he will move the sign plate into the transparent compartment by taking hold of the thumb piece 16 and sliding the sign having "L" thereon within the guide race 5 of that plate, and at night the lamp in the socket 6 will be energized by electricity from the machine, a source of electricity being provided for that purpose. The shade 17 is so positioned as to direct light rays on both sides of the signs when in the display compartment.

Having thus described my invention I desire to secure by Letters Patent and claim:—

1. A vehicle signal comprising a thin rectangularly shaped casing; a plurality of sign plates operable entirely within said casing and spaced from each other by guide strips; a lock positioned centrally on said casing whereby any one of said sign plates may be fastened in display position to indicate the vehicle is being operated contrary to the sign displayed; a light shade on said casing to direct rays of light on said sign plates when exposed to sight; a light globe mounted on said casing to be electrically illuminated; and connecting rods fastened on the respective sign plates and protruding through one end of said casing to move said sign plates as desired.

2. A direction signal for vehicles comprising a thin rectangularly shaped casing of two compartments one of which is glazed on its front and rear sides; a mirror on one side of the other compartment of said casing; a plurality of thin sign plates operable within said casing; rods secured on each of said sign plates by which they are moved and which rods extend beyond one end of said casing; an electric light mounted on said casing; and a shade to direct rays of light from said light onto the glazed portions of said casing.

In testimony whereof I have affixed my signature.

WILLIAM R. MUDD.